(12) United States Patent
Takada et al.

(10) Patent No.: US 12,348,089 B2
(45) Date of Patent: Jul. 1, 2025

(54) STATOR AND MOTOR

(71) Applicant: NIDEC CORPORATION, Kyoto (JP)

(72) Inventors: Hibiki Takada, Kyoto (JP); Tomoya Ueda, Kyoto (JP); Takahiro Hiwa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 759 days.

(21) Appl. No.: 17/762,705

(22) PCT Filed: Sep. 1, 2020

(86) PCT No.: PCT/JP2020/033150
§ 371 (c)(1),
(2) Date: Mar. 22, 2022

(87) PCT Pub. No.: WO2021/065298
PCT Pub. Date: Apr. 8, 2021

(65) Prior Publication Data
US 2022/0345011 A1    Oct. 27, 2022

(30) Foreign Application Priority Data
Sep. 30, 2019   (JP) .................................. 2019-179971

(51) Int. Cl.
*H02K 15/043*    (2025.01)
*H02K 3/12*    (2006.01)
(Continued)

(52) U.S. Cl.
CPC ........... *H02K 15/0433* (2025.01); *H02K 3/12* (2013.01); *H02K 3/28* (2013.01); *H02K 15/066* (2013.01);
(Continued)

(58) Field of Classification Search
CPC ........ H02K 3/12; H02K 3/28; H02K 2203/09; H02K 15/066; H02K 15/0433
See application file for complete search history.

(56) References Cited

U.S. PATENT DOCUMENTS 8,881,371 B2    11/2014    Guercioni
2017/0033619 A1*    2/2017    Tamura .................... H02K 3/28
(Continued)

FOREIGN PATENT DOCUMENTS

| CN | 107492959 A | 12/2017 |
| JP | 201216195 A | 1/2012 |
| JP | 201734848 A | 2/2017 |

OTHER PUBLICATIONS

International Search Report in PCT/JP2020/033150, mailed Nov. 24, 2020. 4pp.

*Primary Examiner* — Tulsidas C Patel
*Assistant Examiner* — Robert E Mates
(74) *Attorney, Agent, or Firm* — HAUPTMAN HAM, LLP

(57) ABSTRACT

A stator includes: a stator core including teeth; pins including a working portion extending in an axial direction in a slot between the teeth; and bus bars electrically connected to the pins. In each slot, the working portions are disposed over stages in a radial direction. The pins include the two working portions disposed across the teeth, a first pin and a second pin each including a connection portion connecting the working portion in a circumferential direction, and a third pin connected to the bus bar. Each of the working portions of the second pin and the third pin is disposed in one of an outermost stage and an innermost stage of the slot. A number of teeth straddled by the second pin is smaller than a number of teeth straddled by the first pin.

8 Claims, 8 Drawing Sheets

(51) Int. Cl.
*H02K 3/28* (2006.01)
*H02K 15/066* (2025.01)
(52) U.S. Cl.
CPC ..... *H02K 2203/09* (2013.01); *H02K 2213/03* (2013.01)

(56) References Cited

U.S. PATENT DOCUMENTS

| | | | | |
|---|---|---|---|---|
| 2018/0287449 | A1* | 10/2018 | Iga | H01R 25/168 |
| 2019/0149004 | A1* | 5/2019 | Tamura | H02K 1/16 |
| | | | | 310/71 |
| 2022/0344997 | A1* | 10/2022 | Takada | H02K 3/12 |

\* cited by examiner

STATOR AND MOTOR

CROSS-REFERENCE TO RELATED APPLICATIONS

This is the U.S. national stage of application No. PCT/JP2020/033150, filed on Sep. 1, 2020, and priority under 35 U.S.C. § 119(a) and 35 U.S.C. § 365(b) is claimed from Japanese Patent Application No. 2019-179971, filed on Sep. 30, 2019.

FIELD OF THE INVENTION

The present invention relates to a stator used in a motor and the motor.

BACKGROUND

Conventionally, a drive device using a motor as a power source is mounted on a vehicle such as an electric vehicle and a plug-in hybrid vehicle. Sometimes a coil (hereinafter, referred to as a plate coil) formed by bending an elongated plate-shaped conductor plate is used in a large-input power motor such as a traction motor that outputs driving force for traveling of the vehicle. For example, a conventional motor in which such a coil is used is known.

Such a plate coil has a problem in that assembly is difficult when a connection shape between slots becomes complicated as compared with a coil formed by a conductive wire. In particular, in the conventional coil, when the coil is disposed one turn in a circumferential direction and then the coil is disposed next one turn, wiring is required to be made so as to be connected to the next slot by changing a bending angle of the plate coil, and thus the difficulty in manufacturing is high.

SUMMARY

One embodiment of the present invention is a stator used in a motor, the stator including: a stator core including an annular core back centered on a center axis and a plurality of teeth extending from the core back toward a radial inside; a plurality of pins including a conductive working portion extending in an axial direction in a slot between the teeth; and a plurality of bus bars electrically connected to the plurality of pins. In each of the slots, the working portions are disposed over a plurality of stages in a radial direction, the plurality of pins include a first pin including the two working portions disposed across the teeth, a second pin including the two working portions disposed across the teeth, and a third pin that includes the one working portion and is connected to the bus bar, each of the first pin and the second pin includes a crossing portion connecting the two working portions in a circumferential direction on one side in the axial direction, and a connection portion connected to another pin on the other side in the axial direction of the working portion, in the first pin, the two working portions are inserted into an identical stage or stages adjacent to each other in the radial direction, each of the working portion of the second pin and the working portion of the third pin is disposed in one of an outermost stage and an innermost stage of the slot, and a number of the teeth straddled by the second pin is smaller than a number of the teeth straddled by the first pin.

The above and other elements, features, steps, characteristics and advantages of the present disclosure will become more apparent from the following detailed description of the preferred embodiments with reference to the attached drawings.

DETAILED DESCRIPTION

Hereinafter, an exemplary preferred embodiment of the present invention will be described with reference to the drawings. In the following description, a direction parallel to the center axis of a motor is referred to as an "axial direction", a direction orthogonal to the center axis of the motor is referred to as a "radial direction", and a direction extending along an arc about the center axis of the motor is referred to as a "circumferential direction".

Figure 1:
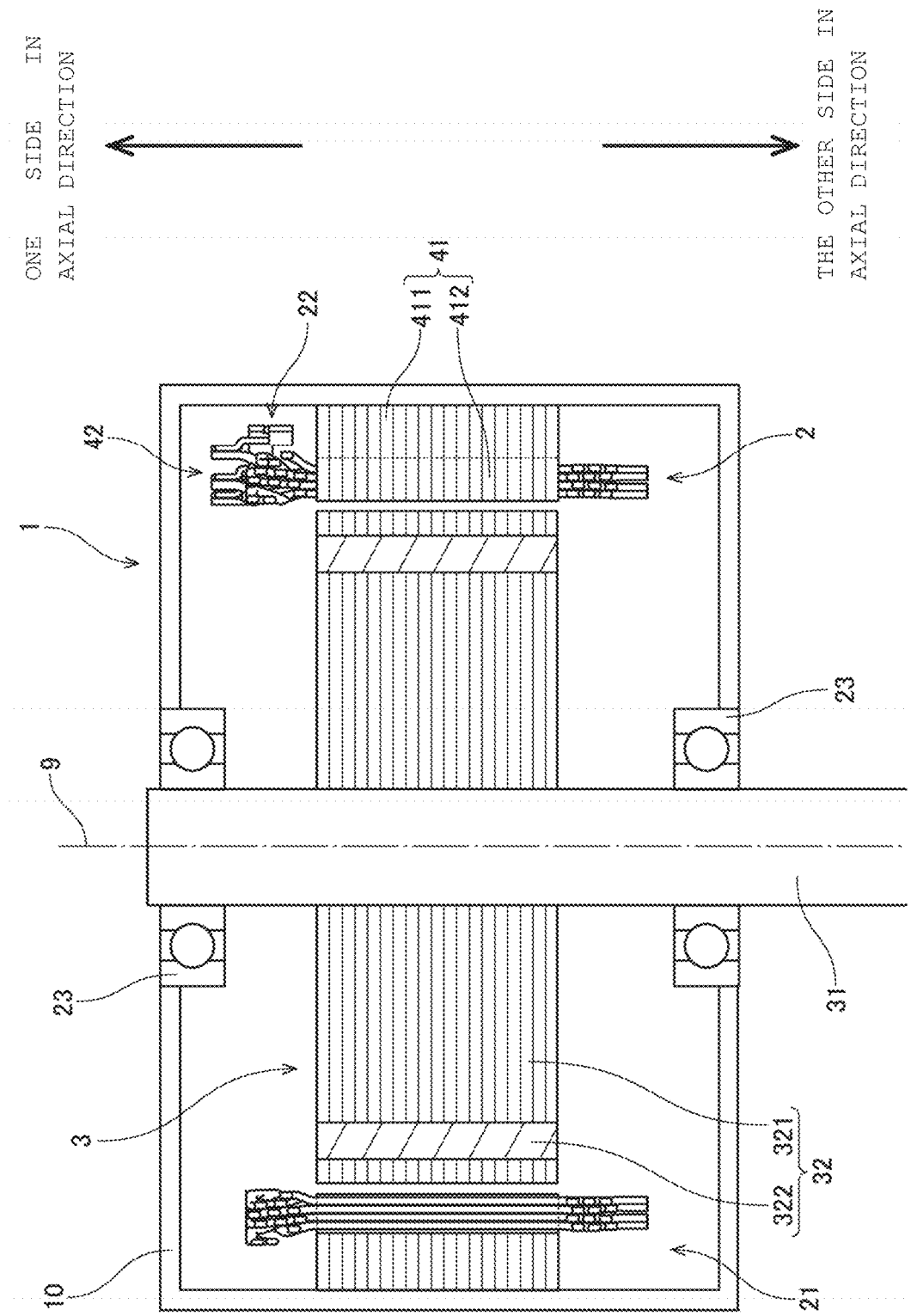
FIG. 1 is a schematic sectional view showing a motor according to a first preferred embodiment.
Figure 2:
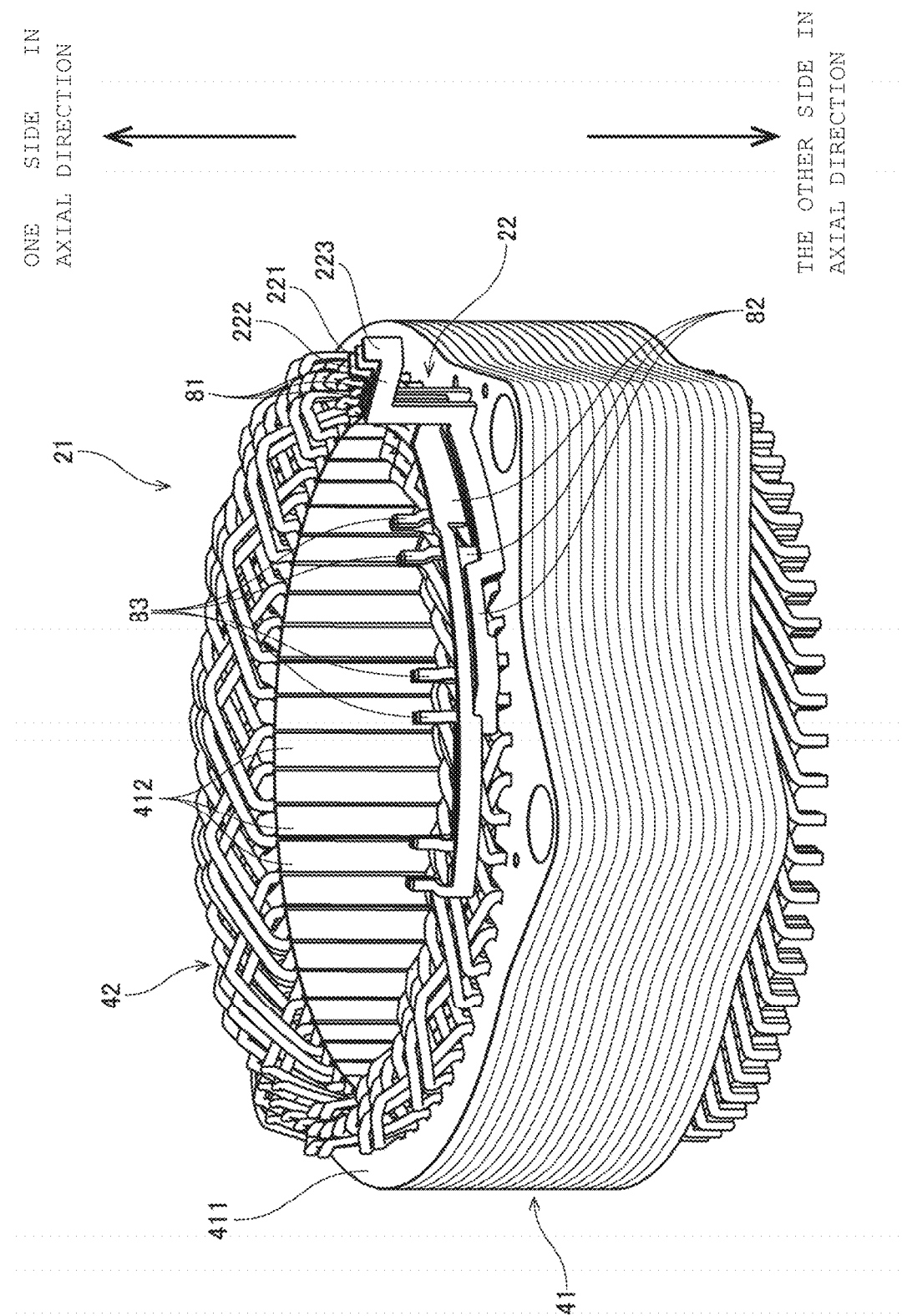
FIG. 2 is a perspective view showing a stator and a bus bar of the first preferred embodiment.
Figure 3:
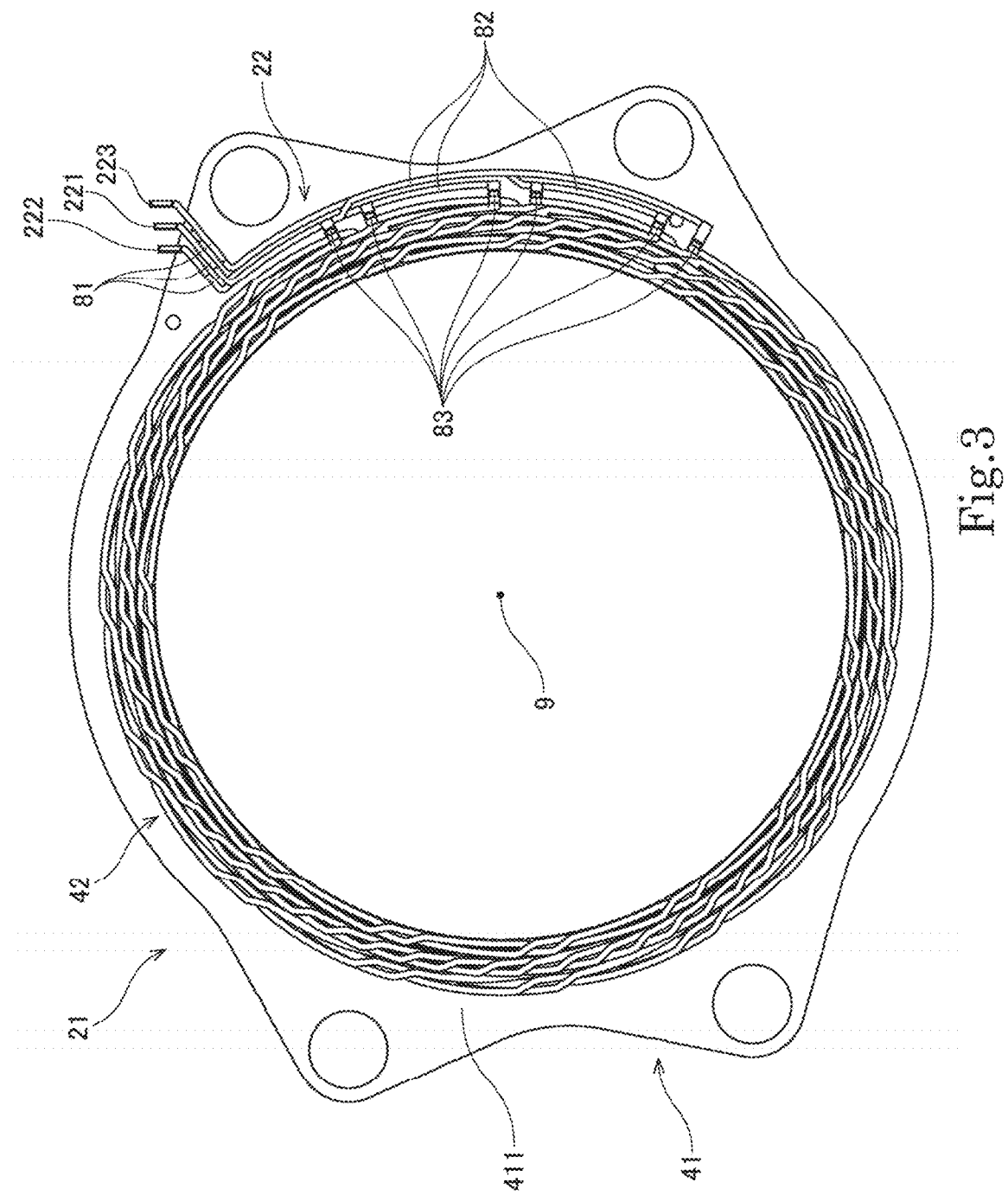
FIG. 3 is a plan view illustrating the stator and the bus bar of the first preferred embodiment when viewed from one side in an axial direction.

FIG. 1 is a schematic sectional view illustrating a motor 1 including a stator 21 according to a first preferred embodiment of the present invention. FIG. 2 is a perspective view of the stator 21 and a bus bar 22. FIG. 3 is a plan view illustrating the stator 21 and the bus bar 22 when viewed from one side in an axial direction.

The motor 1 is a traction motor that is mounted on a vehicle such as an electric vehicle and a plug-in hybrid vehicle and outputs driving force for traveling of the vehicle. However, the motor 1 of the present invention may be a motor for use other than the traction motor. For example, the motor 1 of the present invention may be mounted on an air blowing device, a home electric appliance, a medical instrument, a large-sized industrial facility, and the like to output the driving force.

As illustrated in FIG. 1, the motor 1 includes a motor cover 10, a stationary portion 2, and a rotating portion 3. The motor cover 10 is a housing that accommodates at least parts of the stationary portion 2 and the rotating portion 3. The stationary portion 2 stands still relative to the motor cover 10. The rotating portion 3 is supported so as to be rotatable around a center axis 9 with respect to the stationary portion 2.

As illustrated in FIG. 1, the stationary portion 2 includes the stator 21, the bus bar 22, and two bearings 23. The rotating portion 3 includes a shaft 31 and a rotor 32.

The stator 21 is an armature that generates magnetic flux in accordance with a driving current supplied through the bus bar 22. As illustrated in FIGS. 2 and 3, the stator 21 annularly surrounds the center axis 9. As illustrated in FIGS. 1 to 3, the stator 21 includes a stator core 41, and a coil portion 42.

The stator core 41 is made of a laminated steel sheet in which electromagnetic steel sheets are laminated in the axial direction. The stator core 41 includes an annular core back 411 and a plurality of teeth 412 extending from the core back 411 to the radial inside. An inner periphery of the core back 411 has an annular shape around the center axis 9. The plurality of teeth 412 are arranged at substantially regular intervals in the circumferential direction.

The coil portion 42 is disposed around the teeth 412 through an insulating material such as insulating paper or an insulator. Detailed configuration of the coil portion 42 will be described later.

The bus bar 22 is disposed on one side in the axial direction of the stator 21. The bus bar 22 of the preferred embodiment includes a first bus bar 221, a second bus bar 222, and a third bus bar 223. The bus bar 22 is electrically connected to the coil portion 42.

Each of the three bus bars 221, 222, 223 includes a power supply connection portion 81 extending in the radial direction, an arcuate portion 82 extending in the circumferential direction, and two pin connection portions 83 extending in the axial direction from the arcuate portion 82. A radially outer end of the power supply connection portion 81 is directly or indirectly connected to a power supply device (not illustrated). The arcuate portion 82 extends in the circumferential direction from a radially inner end of the power supply connection portion 81 along the outer periphery of the coil portion 42. Each of the two pin connection portions 83 is welded and electrically connected to a coil end of the coil portion 42 to be described later.

In the preferred embodiment, a three-phase AC current is input to the coil portion 42 through the bus bar 22. The coil portion 42 includes a U-phase coil 421, a V-phase coil 422, and a W-phase coil 423 to which three-phase driving currents having different phases are supplied.

Currents having phases different from each other by ⅓ wavelength are supplied to the first bus bar 221, the second bus bar 222, and the third bus bar 223. In addition, one end of the coil of the U-phase coil 421 (a first connection portion of a later-described offset third pin 53b) is connected to the pin connection portion 83 of the first bus bar 221, and the other end of the coil of the U-phase coil 421 (a first connection portion of a later-described double-sided opening third pin 53a) is connected to the pin connection portion 83 of the second bus bar 222. One end of the coil of the V-phase coil 422 is connected to the pin connection portion 83 of the second bus bar 222, and the other end of the coil of the V-phase coil 422 is connected to the pin connection portion 83 of the third bus bar 223. One end of the coil of the W-phase coil 423 is connected to the pin connection portion 83 of the third bus bar 223, and the other end of the coil of the W-phase coil 423 is connected to the pin connection portion 83 of the first bus bar 221. That is, in the preferred embodiment, the U-phase coil 421, the V-phase coil 422, and the W-phase coil 423 are connected by delta-connection.

Thus, when the driving current is supplied to each of the bus bars 221, 222, 223, the currents having the phases different from each other by ⅓ wavelength flow through the U-phase coil 421, the V-phase coil 422, and the W-phase coil 423.

The two bearings 23 is a mechanism that rotatably supports the shaft 31 with respect to the motor cover 10. As illustrated in FIG. 1, one of the two bearings 23 is disposed on one side in the axial direction of the stator 21. The other of the two bearings 23 is disposed on the other side in the axial direction of the stator 21. For example, a ball bearing in which spherical rolling elements are interposed between an outer ring fixed to the motor cover 10 and an inner ring rotating together with the shaft 31 is used as the bearing 23.

The shaft 31 is a columnar member disposed along the center axis 9. The shaft 31 rotates about the center axis 9 while being supported by the two bearings 23. The end on the other side in the axial direction of the shaft 31 protrudes to the other side in the axial direction from the motor cover 10, and outputs rotational driving force.

The rotor 32 is fixed to the shaft 31, and rotates together with the shaft 31. The rotor 32 of the preferred embodiment is what is called an IPM type rotor in which a magnet 322 is inserted in a rotor core 321 made of a laminated steel plate in which electromagnetic steel plates are laminated in the axial direction. An N-pole magnetic field and an S-pole magnetic field are alternately formed in the circumferential direction on the outer circumferential surface of the rotor 32 by the magnet inserted in the rotor 32. The outer circumferential surface of the rotor 32 is radially opposite to an end face of the inside in the radial direction of the teeth 412 with a slight gap interposed therebetween. That is, the rotor 32 includes a magnetic pole surface opposite to the stator 21 in the radial direction.

For example, the rotor 32 may be what is called an SPM type rotor in which a plurality of magnets are fixed to the outer circumferential surface of a cylindrical rotor core that is a magnetic body, or a magnet resin rotor that is formed in a substantially cylindrical shape and has the outer circumferential surface alternately magnetized to the N pole and the S pole in the circumferential direction.

When the motor 1 is driven, the driving current is supplied from a driving circuit of the motor 1 to the coil portion 42 through the bus bar 22. Thus, the magnetic flux is generated in each of the plurality of teeth 412 of the stator core 41. Furthermore, torque is generated in the circumferential direction by the action of the magnetic flux between the teeth 412 and the rotor 32. As a result, the rotating portion 3 rotates about the center axis 9. In this manner, the rotational driving force is output to a driving target connected to the end on the other side in the axial direction of the shaft 31.

Figure 4:
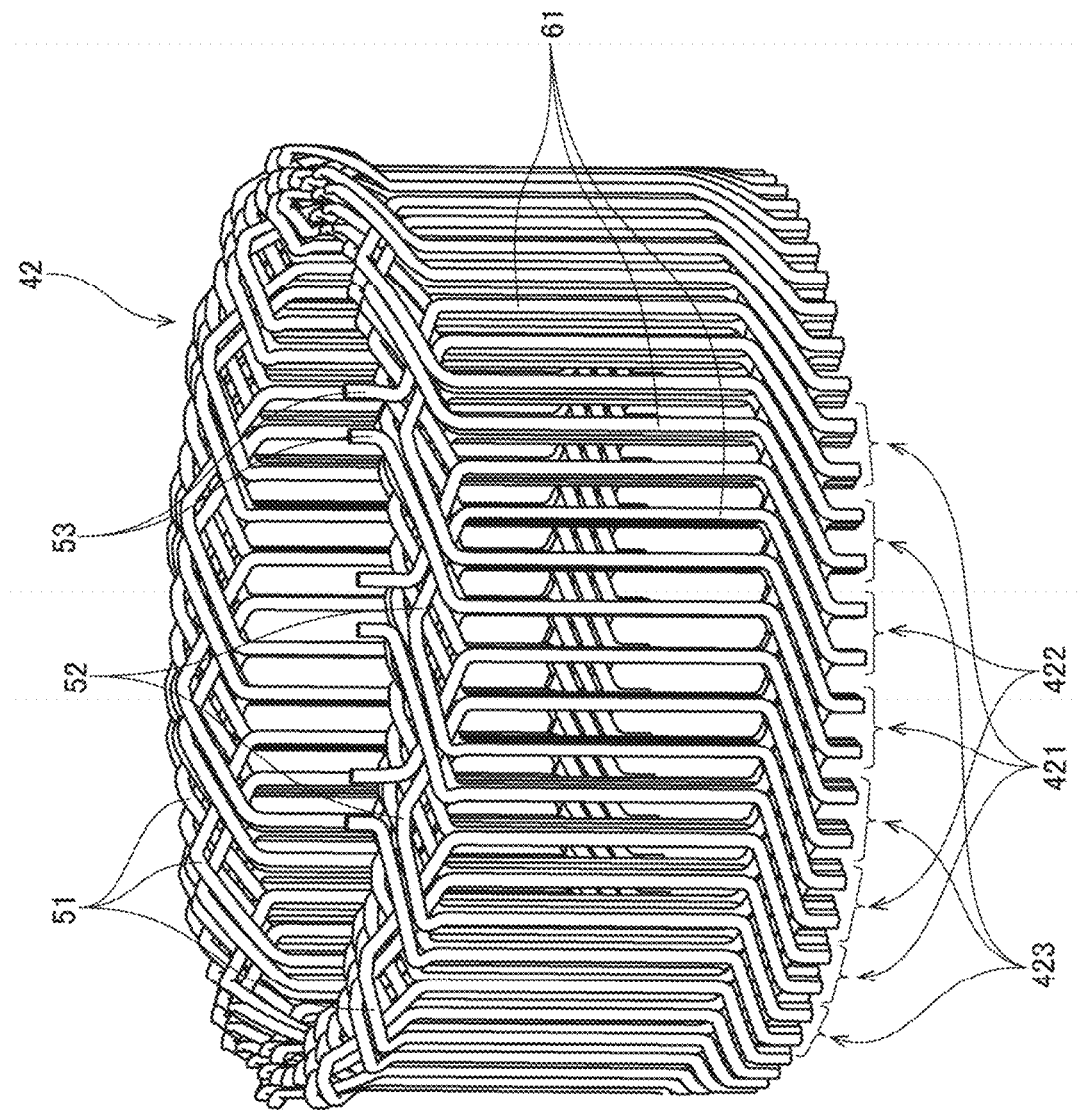
FIG. 4 is a perspective view showing a coil of the first preferred embodiment.
Figure 5:
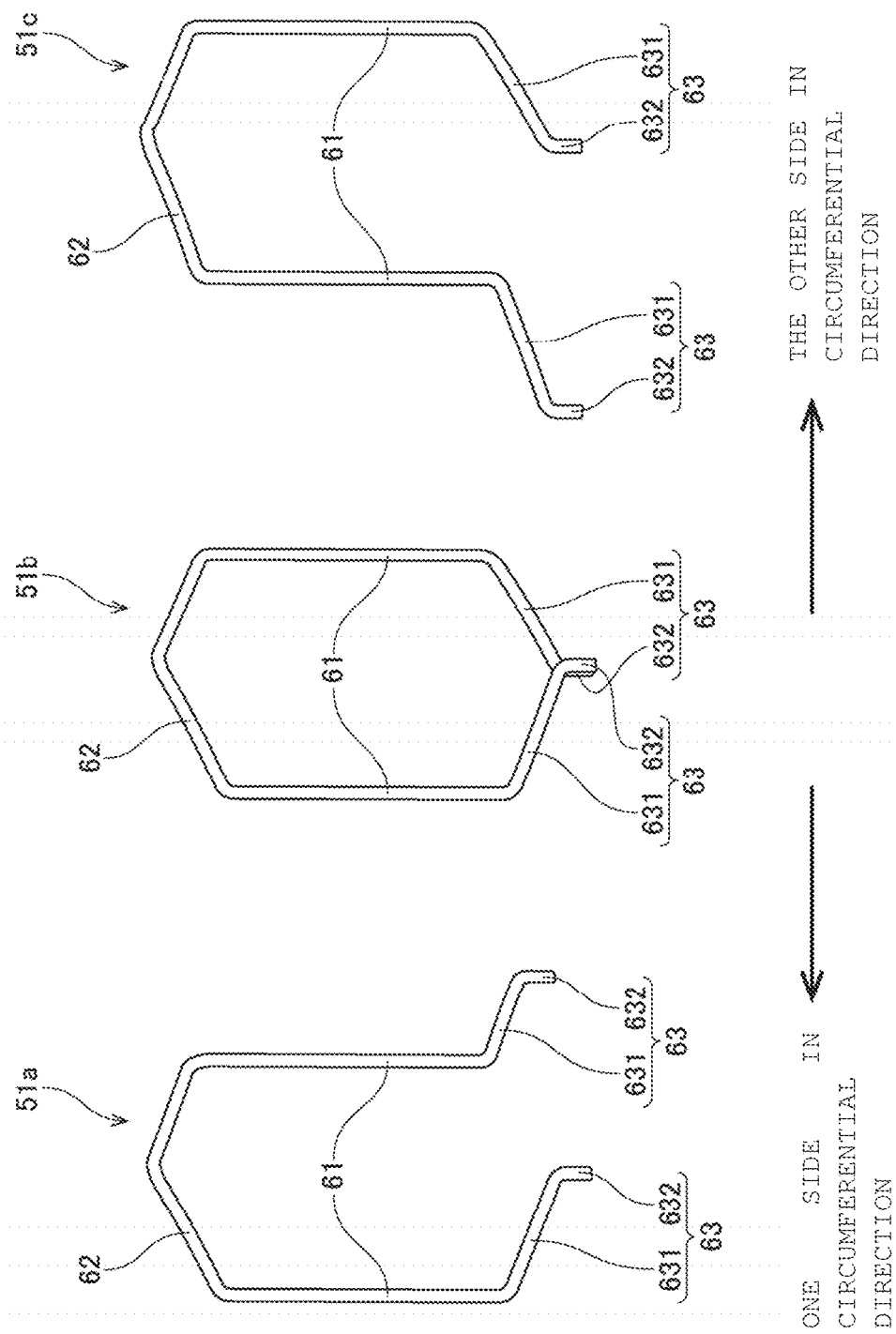
FIG. 5 is a perspective view showing a right-aligned first pin, a centering first pin, and a left-aligned first pin of the first preferred embodiment.
Figure 6:
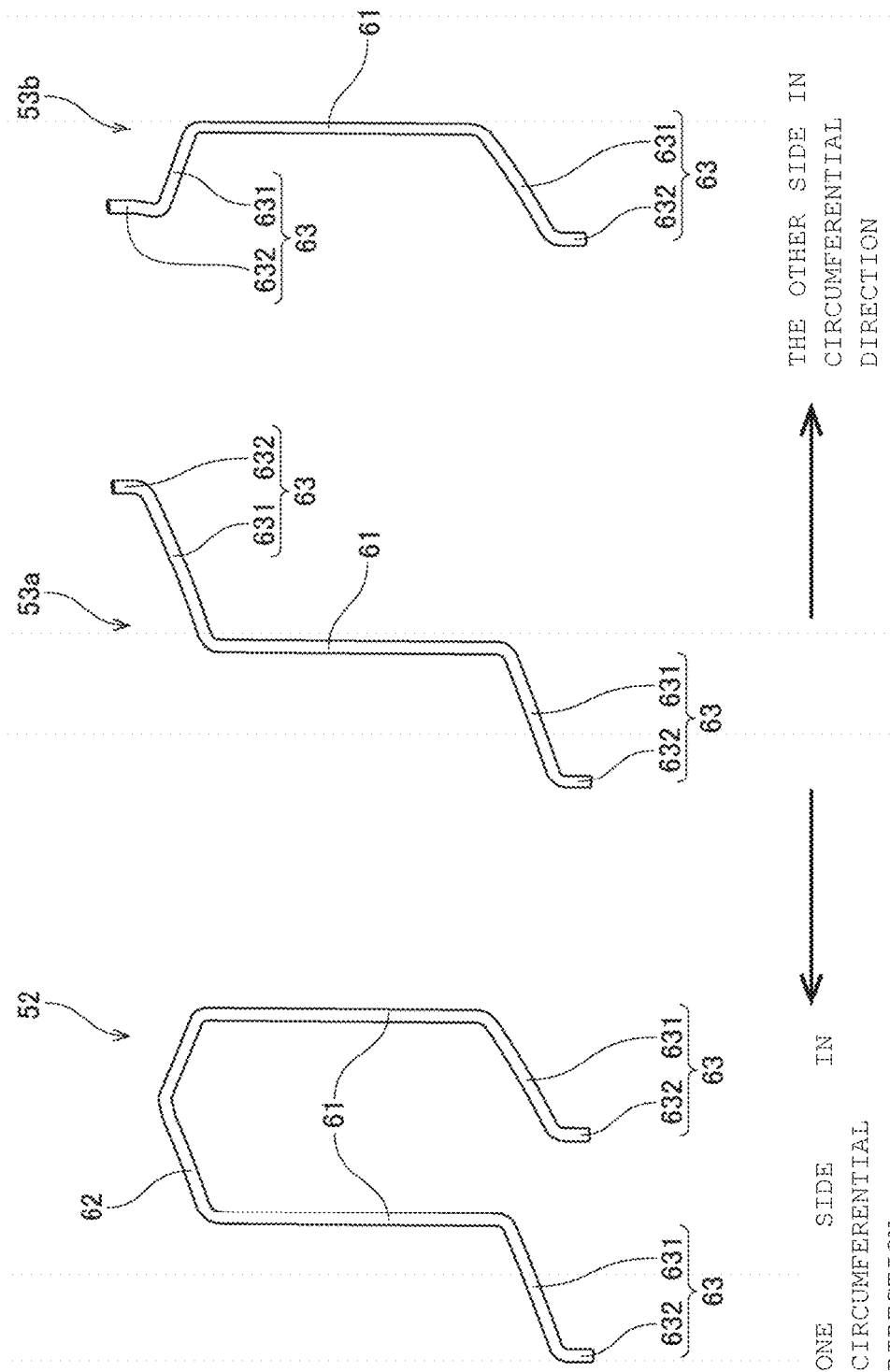
FIG. 6 is a perspective view showing a second pin, a double-sided opening third pin, and an offset third pin of the first preferred embodiment.

With reference to FIGS. 3 to 6, the configuration of the coil portion 42 will be described below. FIG. 4 is a perspective view of the coil portion 42. FIG. 5 is a perspective view illustrating a right-aligned first pin 51a, a centering first pin 51b, and a left-aligned first pin 51c that are specific aspects of a first pin 51. FIG. 6 is a perspective view illustrating a second pin 52 and the double-sided opening third pin 53a and the offset third pin 53b that are specific aspects of a third pin 53. FIGS. 5 and 6 are views illustrating the pins 51a, 51b, 51c, 52, 53a, 53b when viewed from a circumferential outside.

As illustrated in FIG. 4, the coil portion 42 includes a plurality of first pins 51, a plurality of second pins 52, and a plurality of third pins 53. Each of a pluralities of pins 51, 52, 53 is formed by bending an elongated plate-shaped conductive material.

The first pin 51 is a generic name of the right-aligned first pin 51a, the centering first pin 51b, and the left-aligned first pin 51c in FIG. 5. As illustrated in FIG. 5, the first pin 51 includes two working portions 61, a crossing portion 62, and two connection portions 63. The two working portions 61 of the first pin 51 are disposed across the six teeth 412.

As illustrated in FIG. 6, the second pin 52 includes two working portions 61, the crossing portion 62, and two connection portions 63. The two working portions 61 of the second pin 52 are disposed across the five teeth 412. That is, the number of teeth 412 straddled by the two working portions 61 of the second pin 52 is smaller by one than the number of teeth 412 straddled by the two working portions 61 of the first pin 51.

The third pin 53 is a generic term for the double-sided opening third pin 53a and the offset third pin 53b in FIG. 6. As illustrated in FIG. 6, the third pin 53 includes one working portion 61 and two connection portions 63.

The working portion 61 is a region extending in the axial direction in a slot formed between the adjacent teeth 412. In each of the first pin 51 and the second pin 52, the crossing portion 62 circumferentially connects the two working portions 61 on one side in the axial direction. The number of teeth 412 straddled by the crossing portion 62 in the first pin 51 is 6, and the number of teeth 412 straddled by the crossing portion 62 in the second pin 52 is 5.

Each of the connection portions 63 is welded to one of other pins 51, 52, 53 or the bus bars 221 to 223 of the bus bar 22. The connection portion 63 includes an inclination portion 631 extending obliquely with respect to the axial direction from an end in the axial direction of the working portion 61 and a welded end 632 extending in the axial direction from a tip of the inclination portion 631. The two connection portions 63 including the first pin 51 and the second pin 52 are disposed on the other side in the axial direction of the working portion 61. One of the two connection portions 63 included in the third pin 53 is disposed on the other side in the axial direction of the working portion 61, and the other is disposed on one side in the axial direction of the working portion 61.

As illustrated in FIG. 5, in the right-aligned first pin 51a, each of the two inclination portion 631 extends in the other side in the circumferential direction from the working portion 61 toward the welded end 632. In the right-aligned first pin 51a, each of the two welded ends 632 is disposed at a position shifted by three slots to the other side in the circumferential direction with respect to the working portion 61 connected through the inclination portion 631.

In the centering first pin 51b, the two welded ends 632 are disposed at the center in the circumferential direction. For this reason, in the centering first pin 51b, each of the two inclination portions 631 extends from the working portion 61 to the welded end 632 disposed at the center in the circumferential direction. Specifically, the welded end 632 connected to the working portion 61 on one side in the circumferential direction is disposed at a position shifted by three slots to the other side in the circumferential direction with respect to the connected working portion 61.

On the other hand, the welded end 632 connected to the working portion 61 on the other side in the circumferential direction is disposed at a position shifted by three slots to one side in the circumferential direction with respect to the connected working portion 61. As a result, in the two welded ends 632 included in the centering first pin 51b, the positions in the circumferential direction are matched with each other. Because the two working portions 61 and the connection portion 63 that are included in the centering first pin 51b have different radial positions, the two welded ends 632 also have different radial positions.

In the left-aligned first pin 51c, each of the two inclination portions 631 extends in one side in the circumferential direction from the working portion 61 toward the welded end 632. In the left-aligned first pin 51c, each of the two welded ends 632 is disposed at a position shifted by three slots to one side in the circumferential direction with respect to the working portion 61 connected through the inclination portion 631.

As illustrated in FIG. 6, in the second pin 52, each of the two inclination portions 631 extends in one side in the circumferential direction from the working portion 61 toward the welded end 632. In the second pin 52, each of the two welded ends 632 is disposed at a position shifted to one side in the circumferential direction with respect to the working portion 61 connected through the inclination portion 631.

In the connection portion 63 on one side in the axial direction of the double-sided opening third pin 53a, the inclination portion 631 extends in the other side in the circumferential direction from the end on one side in the axial direction of the working portion 61 toward the welded end 632. The welded end 632 on one side in the axial direction is disposed at a position shifted by three slots to the other side in the circumferential direction with respect to the working portion 61. In the connection portion 63 on the other side in the axial direction of the double-sided opening third pin 53a, the inclination portion 631 extends in one side in the circumferential direction from the end on the other side in the axial direction of the working portion 61 toward the welded end 632. The welded end 632 on the other side in the axial direction is disposed at a position shifted to one side in the circumferential direction with respect to the working portion 61.

In each of the two connection portions 63 of the offset third pin 53b, the inclination portion 631 extends in one side in the circumferential direction from the end of the working portion 61 toward the welded end 632. Each of the two welded ends 632 is disposed at a position shifted by three slots on one side in the circumferential direction with respect to the working portion 61.

The coil portion 42 includes the plurality of pins 51, 52, 53. In addition, the coil portion 42 includes the U-phase coil 421, the V-phase coil 422, and the W-phase coil 423 having the same shape. The V-phase coil 422 is disposed at a position rotated to one side in the 4-slot circumferential direction from the U-phase coil 421. The W-phase coil 423 is disposed at a position rotated to one side in the 8-slot circumferential direction from the U-phase coil 421.

The plurality of pins 51, 52, 53 configuring the U-phase coil 421 are connected in series between the pin connected to the first bus bar 221 and the pin connected to the second bus bar 222. The plurality of pins 51, 52, 53 configuring the V-phase coil 422 are connected in series between the pin connected to the second bus bar 222 and the pin connected to the third bus bar 223. The plurality of pins 51, 52, 53 configuring the W-phase coil 423 are connected in series between the pin connected to the third bus bar 223 and the pin connected to the first bus bar 221.

Figure 7:
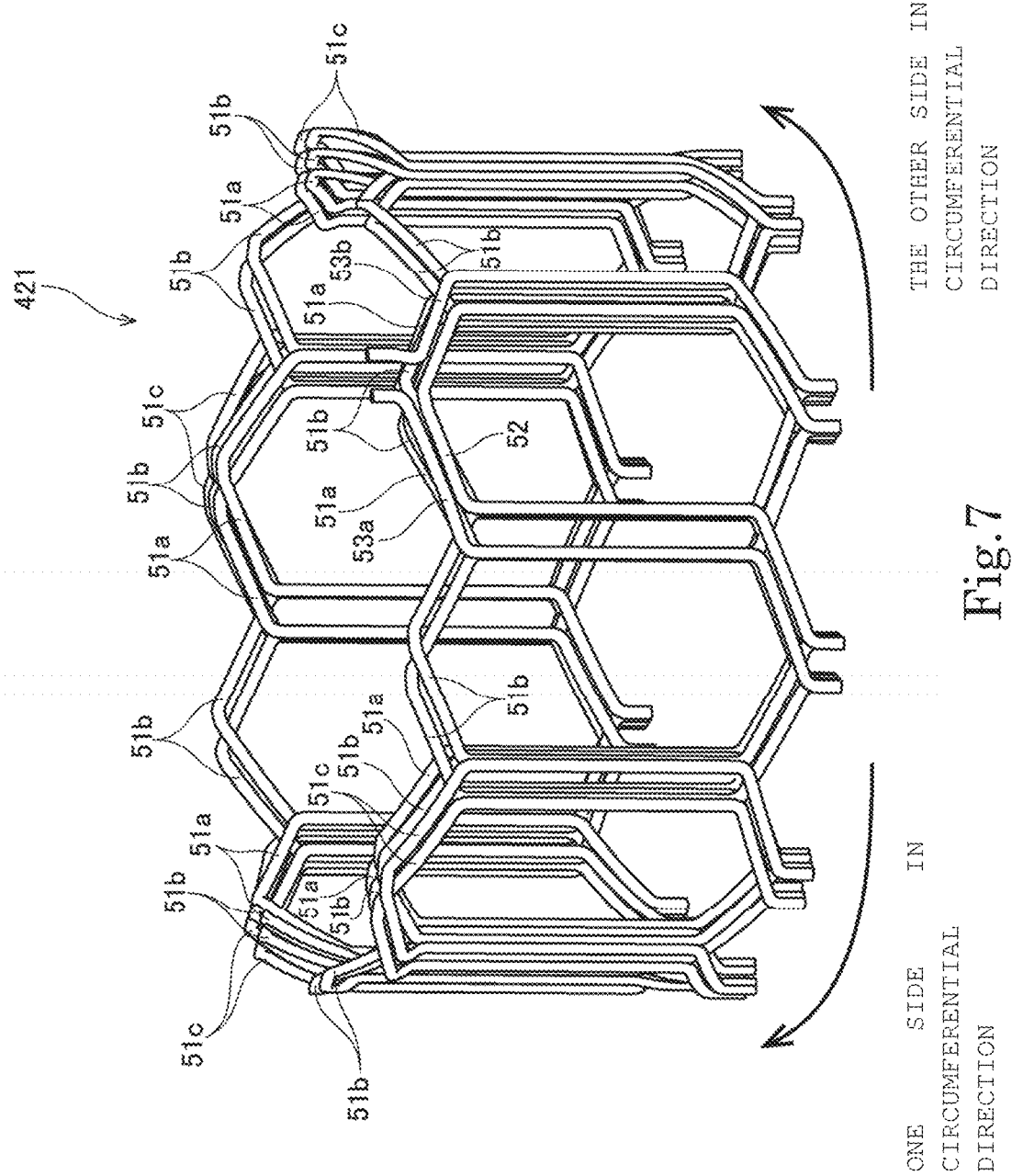
FIG. 7 is a perspective view showing a U-phase coil of the first preferred embodiment.
Figure 8:
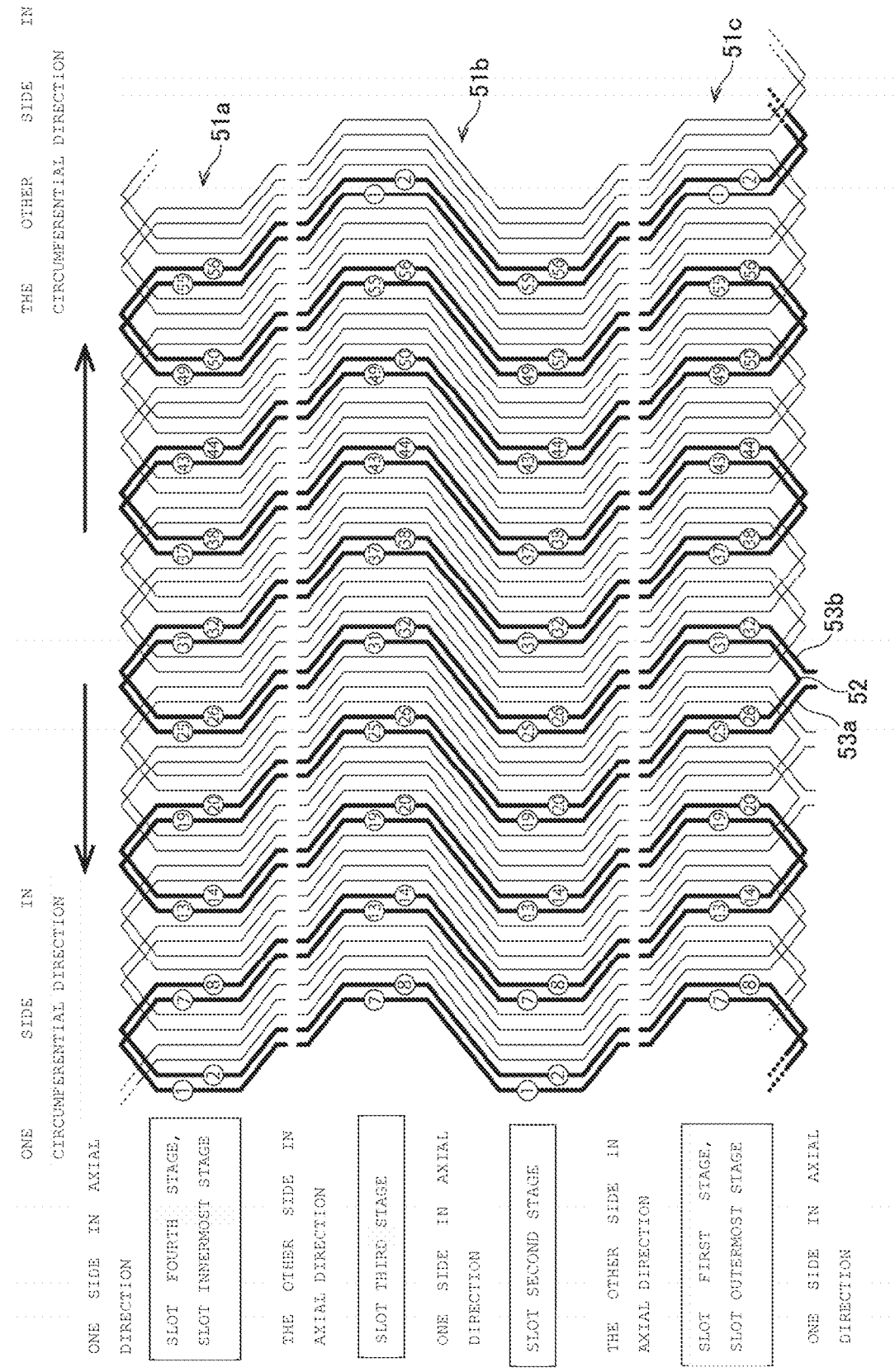
FIG. 8 is a schematic view schematically showing connection between all pins of a coil portion of the first preferred embodiment.

In order to implement such a configuration with a simple configuration, the pins 51, 52, 53 described below are arranged. FIG. 7 is a perspective view illustrating only the U-phase coil 421 of the coil portion 42. As described above, the V-phase coil 422 and the W-phase coil 423 have the same configuration as the U-phase coil 421. FIG. 8 is a schematic view illustrating connection of all the pins 51, 52, 53 of the coil portion 42.

As illustrated in FIGS. 1, 2, 4, and 7, a plurality of working portions 61 are arranged side by side in the radial direction in one slot. In the preferred embodiment, four working portions 61 are arranged in one slot. Hereinafter, the working portion 61 disposed on the outermost side in the radial direction in one slot is referred to as a first stage (outermost stage), the working portion 61 adjacent to the radial inside of the first stage is referred to as a second stage, the working portion 61 adjacent to the radial inside of the second stage is referred to as a third stage, and the working portion 61 disposed on the innermost side in the radial direction is referred to as a fourth stage (innermost stage).

In FIG. 8, the pins 51, 52, 53 belonging to the U-phase coil 421 are indicated by thick lines. In FIG. 8, a slot number is assigned to the working portion 61 belonging to the U-phase coil 421. Slot Nos. 1 and 2 are assigned to one set of two slots in which the working portions 61 of the U-phase coil 421 are continuously arranged. The slot number increases from one side to the other side in the circumferential direction. In the preferred embodiment, each of the numbers of teeth 412 and slots is 60. For this reason, the slot No. 1 is adjacent to the other side in the circumferential direction of the slot No. 60.

As illustrated in FIG. 8, in the stator 21, all of the four working portions 61 disposed in one slot are only the working portion 61 belonging to any one of the U-phase coil 421, the V-phase coil 422, and the W-phase coil 423.

Hereinafter, the slot in which the working portion 61 of the U-phase coil 421 is disposed is referred to as a U-phase slot, the slot in which the working portion 61 of the V-phase coil 422 is disposed is referred to as a V-phase slot, and the slot in which the working portion 61 of the W-phase coil 423 is disposed is referred to as a W-phase slot.

Six slot formation including two U-phase slots, two V-phase slots, and two W-phase slots are repeatedly arranged from one side to the other side in the circumferential direction. In FIG. 8, slot Nos. 1, 2, 7, 8, 13, 14, 19, 20, 25, 26, 31, 32, 37, 38, 43, 44, 49, 50, 55, and 56 are U-phase slots. That is, each two slots through which the U-phase current flows are disposed at ten places. For this reason, the number of poles of the stator 21 is ten.

As illustrated in FIG. 8, the right-aligned first pin 51a is disposed on the fourth stage that is the innermost stage of the slot such that the crossing portion 62 is on one side in the axial direction. In the right-aligned first pin 51a, both of the two working portions 61 are disposed in the fourth stage.

The centering first pin 51b is disposed in the third stage to the second stage of the slot. More specifically, in the centering first pins 51b disposed in the third stage and the second stage, the working portion 61 on the other side in the circumferential direction is disposed in the third stage, and the working portion 61 on one side in the circumferential direction is disposed in the second stage.

The two working portions 61 of the right-aligned first pin 51a disposed in the fourth stage are respectively connected to different centering first pins 51b. More specifically, the welded ends 632 of the connection portions 63 extending from the two working portions 61 of the right-aligned first pin 51a disposed in the fourth stage are respectively welded to the welded ends 632 of the connection portions 63 extending from the working portions 61 of the centering first pin 51b disposed in the third stage.

The left-aligned first pins 51c are disposed on the first stage that is the outermost stage of the slots, except for predetermined four slots (Nos. 25, 26, 31, and 32 in the example of FIG. 8). The predetermined four slots are referred to as irregular disposition slots. The irregular disposition slot includes a set of two U-phase slots (Nos. 25 and 26 in the example of FIG. 8) adjacent to each other and another set of two U-phase slots (Nos. 31 and 32 in the example of FIG. 8) adjacent to each other. The set of two slots and the other set of two slots are adjacent to each other in the circumferential direction with the two V-phase slots and the two W-phase slots interposed therebetween.

The two working portions 61 of the left-aligned first pins 51c disposed in the first stage are connected to different centering first pins 51b. More specifically, the welded ends 632 of the connection portions 63 extending from the two working portions 61 of the left-aligned first pins 51c disposed in the first stage are respectively welded to the welded ends 632 of the connection portions 63 extending from the working portions 61 of the centering first pin 51b disposed in the second stage.

Furthermore, two centering first pins 51b connected to one right-aligned first pin 51a are connected to different left-aligned first pins 51c. In the connection at the first pin 51 described above, all the stages of the even-numbered U-phase slots are connected in series except for the first stage of the irregular disposition slot, and all the stages of the odd-numbered U-phase slots are connected in series.

In this manner, in order to connect the working portions 61 of the U-phase slots to each other to ensure rotational symmetry of the working portions 61 of the U-phase slots excluding the outermost stages of the irregular disposition slots, the number (6) of teeth 412 straddled by the working portions included in the first pin 51 is a number obtained by dividing the number (60) of teeth 412 by the number (10) of poles of the stator 21.

In the second pin 52, the two working portions 61 are disposed in the slot on the other side in the circumferential direction (No. 26 in the example of FIG. 8) out of the two slots on one side in the circumferential direction in the four slots included in the irregular disposition slot and the slot on one side in the circumferential direction (No. 31 in the example of FIG. 8) out of the two slots on the other side in the circumferential direction. The welded end 632 of the connection portion 63 extending from the two working portions 61 of the second pin 52 is welded to the welded end 632 of the centering first pin 51b disposed in the second stage.

Thus, the even-numbered U-phase slots connected in series and the odd-numbered U-phase slots connected in series are connected in series. At this point, when the welded ends 632 on the other side in the circumferential direction of the odd-numbered U-phase slot and the even-numbered U-phase slot (for example, Nos. 25 and 26) adjacent to each other are connected, the directions of the current flowing in the two adjacent U-phase slots are reversed. In the coil portion 42, the direction of the current flowing in the two U-phase slots adjacent to each other can be aligned using the second pin 52 in which the number of straddled teeth 412 is smaller by one than that of the first pin 51.

The double-sided opening third pin 53a is disposed on the most one side in the circumferential direction (No. 25 in the example of FIG. 8) of the irregular disposition slot. The offset third pin 53b is disposed on the most other side in the circumferential direction (No. 32 in the example of FIG. 8) of the irregular disposition slot. Thus, the welded end 632 on the other side in the axial direction of the double-sided opening third pin 53a and the welded end 632 on the other side in the axial direction of the offset third pin 53b can be disposed close to each other.

The welded end 632 on one side in the axial direction of the two third pins 53 is welded to the bus bar 22 and serves as the electrically-connected coil end. That is, the connection portion 63 on one side in the axial direction of the third pin 53 is a first connection portion electrically connected to any one of the bus bars 221, 222, 223. The connection portion 63 on the other side in the axial direction of the third pin 53 is a second connection portion connected to the other pin 51.

In the preferred embodiment, the welded end 632 on one side in the axial direction of the offset third pin 53b disposed on the other side in the circumferential direction of the second pin 52 becomes one end of the coil connected to the first bus bar 221. The welded end 632 on one side in the axial direction of the double-sided opening third pin 53a disposed on one side in the circumferential direction of the second pin 52 becomes the other end of the coil connected to the second bus bar 222. In this manner, the U-phase coil 421 includes two third pins 53 that become coil ends. That is, the coil portion 42 includes six third pins 53 as a whole.

With such a configuration, the pins 51, 52, 53 can be efficiently disposed when the coils of the same phase are disposed over at least two turns and when the working portions 61 of the same phase forming the same pole are disposed continuously in the plurality of slots. In addition, all the welded ends 632 of all the pins 51, 52, 53 can be disposed at positions shifted in the circumferential direction by the same number of slots from the working portion 61 connected through the inclination portion 631. That is, the angles of all the inclination portions 631 with respect to the working portions 61 can be made substantially uniform.

At the time of manufacturing the coil portion 42, the working portion 61 is disposed in the slot of the stator core 41 while the connection portion 63 is linearly and continuously disposed to the working portion 61. Then, the connection portion 63 is bent using a tool to dispose obliquely the inclination portion 631 with respect to the working portion 61. As described above, when the angles of all the inclination portions 631 with respect to the working portions 61 are made uniform, a single type of tool bending the connection portion 63 can be provided at the time of manufacturing the coil portion 42. In addition, when the angles of all the inclination portions 631 with respect to the working portions 61 are made uniform, the manufacturing process can be simplified as compared with the case where there are a plurality of types of bending angles by the pins 51, 52, 53. Accordingly, ease of manufacturing the coil portion 42 that is a plate coil can be improved.

In the preferred embodiment, the welded ends 632 connected to the bus bars 221, 222, 223 of the U-phase coil 421, the V-phase coil 422, and the W-phase coil 423 are disposed close to each other in the circumferential direction. Therefore, all the bus bars 221, 222, 223 are disposed within the range of 90° in the circumferential direction. This makes it easy to perform the welding process between each of the coils 421, 422, 423 and each of the bus bars 221, 222, 223.

While the exemplary preferred embodiment of the present invention has been described above, the present invention is not limited to the preferred embodiment described above.

In the preferred embodiment, the second pin and the third pin are disposed at the outermost stage, but the present invention is not limited thereto. The second pin and the third pin may be disposed at the innermost stage.

In the preferred embodiment, the number of slots is 60, but the present invention is not limited thereto. When there are three-phase inputs of the U-phase, the V-phase, and the W-phase and when the number of slots through which in-phase currents flow continuously is two, the number of teeth straddled by the first pin is six similarly to the preferred embodiment. Accordingly, for example, the number of slots may be 36 or 48. Also in this case, similarly to the preferred embodiment, the number of slots is a multiple of six, and the number of teeth straddled by the first pin is a number obtained by dividing the number of teeth by the number of poles of the stator.

The number of phases of the input power is not limited to three phases, but may be at least four phases. In addition, the number of slots through which in-phase currents flow continuously may be at least three. Even in these cases, the number of teeth straddled by the first pin is a number obtained by dividing the number of teeth by the number of poles of the stator.

In the preferred embodiment, the number of stages formed in one slot is four, but the present invention is not limited thereto. The number of stages formed in one slot may be at least five. Even in this case, the second pin and the third pin are disposed in a part of either the outermost step or the innermost step, and the first pin is disposed in the other steps and places. For example, when the number of stages formed in one slot is six, the first pin, the second pin, and the third pin may be disposed in the outermost stage (first stage) of the slot, and the first pin may be disposed in the second stage to the third stage, the fourth stage to the fifth stage, and the sixth stage of the slot.

With regard to the detailed shapes of the stator and the motor, the shapes may be different from those illustrated in the drawings of this application. Also note that features of the above-described embodiment and the modifications thereof may be combined appropriately as long as no conflict arises.

The present invention can be used in a stator and a motor. Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:
1. A stator used in a motor, the stator comprising:
a stator core including an annular core back centered on a center axis and a plurality of teeth extending from the core back toward a radial inside;
a plurality of pins including a conductive working portion extending in an axial direction in a slot between the teeth; and
a plurality of bus bars electrically connected to the plurality of pins,
wherein in each of the slots, the working portions are disposed over a plurality of stages in a radial direction,
the plurality of pins include
a first pin including the two working portions disposed across the teeth,
a second pin including the two working portions disposed across the teeth, and
a third pin that includes the one working portion and is connected to the bus bar,
each of the first pin and the second pin includes
a crossing portion connecting the two working portions in a circumferential direction on one side in the axial direction, and
a connection portion connected to another pin on the other side in the axial direction of the working portion,
in the first pin, the two working portions are inserted into an identical stage or stages adjacent to each other in the radial direction, each of the working portion of the second pin and the working portion of the third pin is disposed in one of an outermost stage and an innermost stage of the slot, and
a number of the teeth straddled by the second pin is smaller than a number of the teeth straddled by the first pin.

2. The stator according to claim 1, wherein the number of the teeth straddled by the two working portions included in the first pin is a number obtained by dividing the number of the teeth by the number of poles of the stator.

3. The stator according to claim 1, wherein the number of the teeth straddled by the two working portions included in the second pin is smaller by one than the number of the teeth straddled by the two working portions included in the first pin.

4. The stator according to claim 1, wherein each of the third pins includes
a first connection portion electrically connected to the bus bar on the one side in the axial direction of the working portion, and
a second connection portion connected to another pin on the other side in the axial direction of the working portion.

5. The stator according to claim 1, wherein the number of the third pins is six.

6. The stator according to claim 1, wherein each of the bus bars includes
a power supply connection portion extending in the radial direction, an end on a radial outside of the power supply connection portion being directly or indirectly connected to a power supply device,
an arcuate portion extending in the circumferential direction from an end on a radial inside of the power supply connection portion, and
a pin connection portion that extends in the axial direction from the arcuate portion and is electrically connected to the third pin.

7. The stator according to claim 6, wherein the plurality of bus bars are disposed within a range of 90° in the circumferential direction.

8. A motor comprising:
the stator according to claim 1; and
a rotor that is disposed on the radial inside of the stator core and supported so as to be rotatably about the center axis.

* * * * *